United States Patent [19]

Silverman

[11] 4,069,471
[45] Jan. 17, 1978

[54] METHOD OF DETERMINING WEATHERING CORRECTIONS IN SEISMIC RECORD PROCESSING

[75] Inventor: Daniel Silverman, Tulsa, Okla.

[73] Assignee: Geophysical Systems Corporation, Pasadena, Calif.

[21] Appl. No.: 666,359

[22] Filed: Mar. 12, 1976

[51] Int. Cl.$^2$ ............................................. G01V 1/36
[52] U.S. Cl. ..................... 340/15.5 TC; 340/15.5 TD; 340/15.5 CP; 340/15.5 CC
[58] Field of Search ................ 340/15.5 TC, 15.5 CC, 340/15.5 TD, 15.5 MC, 15.5 CP

[56] References Cited

U.S. PATENT DOCUMENTS

| | | | |
|---|---|---|---|
| 2,087,120 | 7/1937 | Salvatori et al. | 340/15.5 TC |
| 3,629,798 | 12/1971 | Rockwell | 340/15.5 TC |
| 3,681,749 | 8/1972 | Ferree et al. | 340/15.5 TC |
| 3,731,269 | 5/1973 | Judson et al. | 340/15.5 TC |
| 3,794,827 | 2/1974 | Widess | 340/15.5 CP |

OTHER PUBLICATIONS

"A Technique for Solving the Low-Velocity Layer Problem," Thompson, Geophysics, vol. 28, No. 5, Oct. 63, pp. 869-876.
Exploration Geophysics, Sukosky, 1950, pp. 714-725.

*Primary Examiner*—Howard A. Birmiel
*Attorney, Agent, or Firm*—Daniel Silverman

[57] ABSTRACT

The method of determining the magnitude of the differential static correction between two selected adjacent receiver points D, E, in a linear seismic array, that involves the steps of: recording a first multi-trace record responsive to a first seismic wave generated at a first source point C on one side of D, E at any distance; recording a second corresponding multi-trace record responsive to a second seismic wave at a second source point F on the opposite side of D, E at any distance; correlating a first trace CE with a second trace CD of the first record to obtain a first time difference R; correlating the corresponding first trace FD with a second trace FE of the second record to get a second time difference S; and determining the value of $K = (R - S)/2$, where $K$ is a value of the static correction equal to the difference in the travel time through the weathered layer at D and E. The process can be repeated for other positions of C, F to obtain other independent values of K. The various values of K can be averaged to provide an improved value of differential static correction at receiver points D, E. The method is applicable also to determining the differential static correction at two adjacent source points.

20 Claims, 3 Drawing Figures

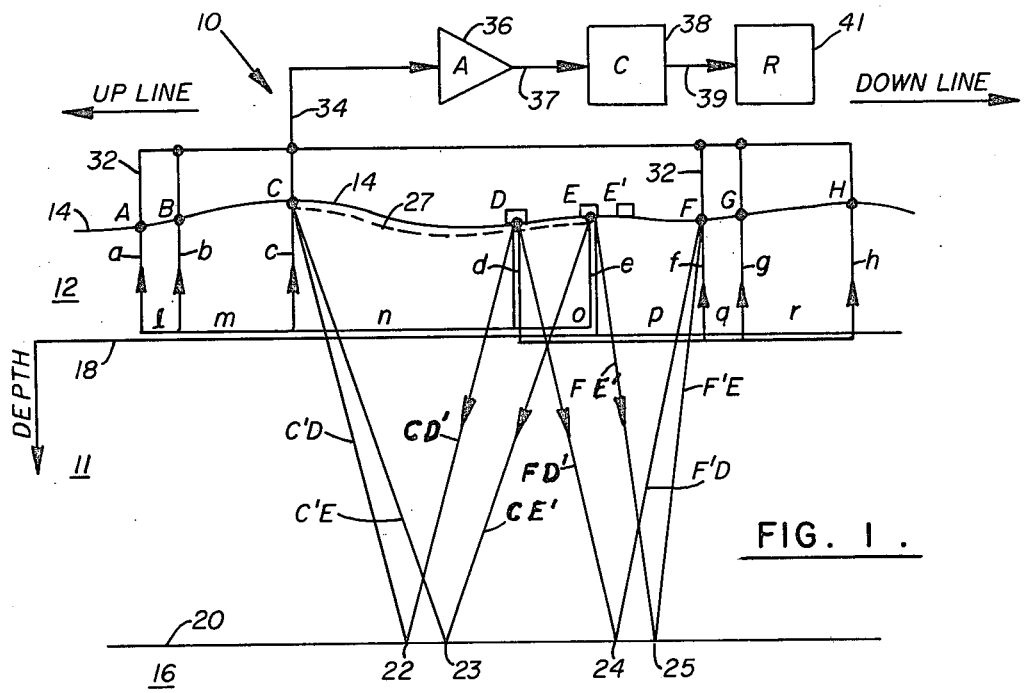
FIG. 1.
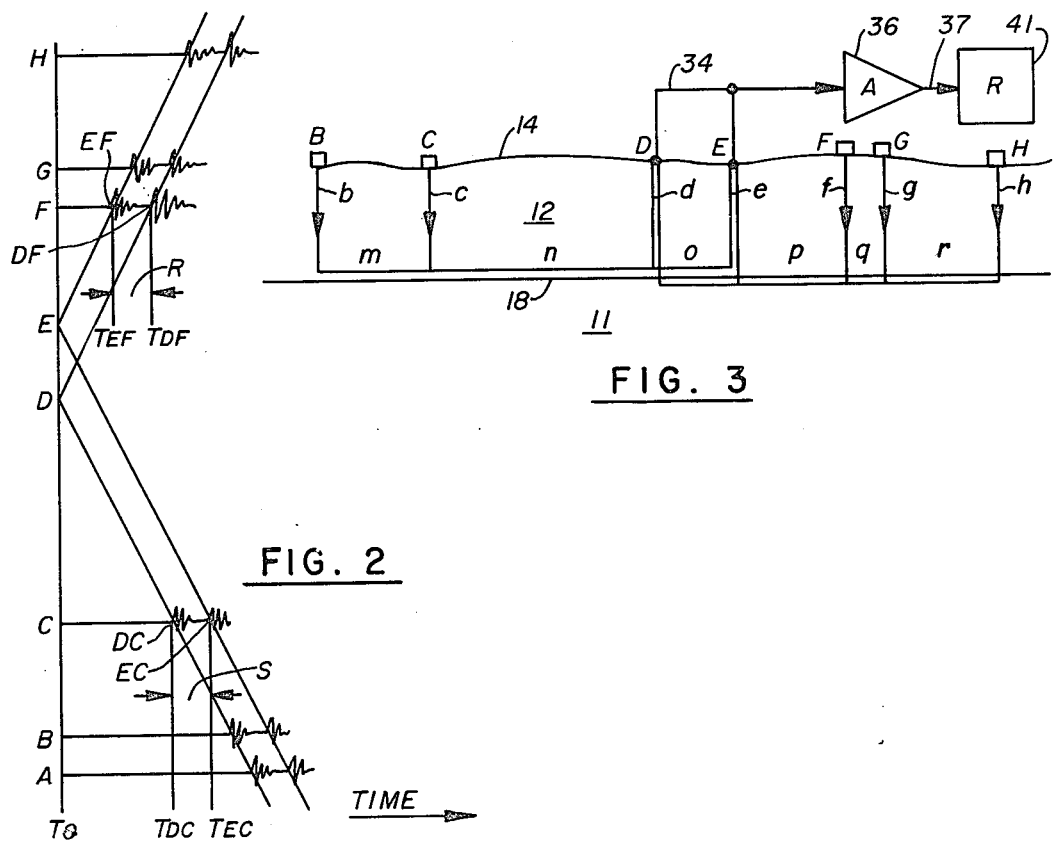
FIG. 2
FIG. 3

METHOD OF DETERMINING WEATHERING CORRECTIONS IN SEISMIC RECORD PROCESSING

REFERENCE claimed: APPLICATIONS

This application is related to the copending application Ser. No. 617,859, filed Sept. 29, 1975, entitled: Method and Apparatus for Processing Seismic Signals from Low Energy Sources, of Lincoln A. Martin and William F. Fenley Jr.

This application is also related to the copending Application of Lincoln A. Martin filed on the same date as this application and entitled: Method of Determining Differential Weathering Corrections in Seismic Record Processing.

DEFINITIONS

CORRELATION: Identifying a phase of a seismic record as representing the same phase of another record. Indicating that events on two seismic record or traces are reflections from the same stratigraphic sequence or refractions from the same marker.

CROSS CORRELATION FUNCTION: A measure of the similarity of two waveforms. A graph of the results of a correlation operation. A correlogram.

FIRST BREAK: The first recorded signal attributable to seismic wave travel from a known source. First breaks on reflection records are used for information about the weathering.

RECORD: A recording of the energy from one shot or other type of source, picked up by a spread of geophones. A record may be on photographic or other paper, or on magnetic tape. A TRACE is a record of a single geophone channel.

REFRACTION WAVE: A wave which travels obliquely downward from a source in a low velocity formation to a high velocity formation, then within the high velocity formation parallel to the interface, and finally, obliquely upward in the low velocity formation to the detectors.

WEATHERING: The low velocity layer, a zone of low velocity material near the earth's surface, at the base of which the velocity abruptly increases. The term LVL (lower velocity layer) is also often used. Weathering velocity is typically 1500 to 2500 fps. The subweathering velocity may be 5000fps or greater.

WEATHERING CORRECTION: A correction of seismic reflection or refraction times to remove the delay in the LVL.

TIME BREAK: The mark on a seismic record which indicates the shot instant or the time at which the seismic wave from any type of source was generated.

TRAVELTIME: The time between the time break and the recording of a seismic event, such as a first break.

SOURCEPOINT: Position of the source of the seismic wave.

RECEIVER POINT: GEOPHONE POINT: Position of the geophone or other receiver or detector of the seismic wave.

BACKGROUND OF THE INVENTION

This invention lies in the field of seismic processing. More particularly, it concerns the determination of weathering or static corrections between records recorded from sources at adjacent source points, or between traces to adjacent geophone points.

While this invention can be used with any type of source, it is of greatest value in relation to sources which are initiated at the surface of the earth, such as the Vibroseis, the Dynoseis, the thumper, and others. It will for convenience be described in terms of the vibratory source systems.

In the seismic process of geophysical prospecting, wherein a vibratory source generates an alternating pressure on the surface of the earth at a first source point, it is important to know the time of travel of the seismic wave from the surface through the weathered layer. More correctly, it is important to know the difference in the times of travel through the weathered layer of the downgoing seismic waves generated by the source at each of two adjacent source points. This is needed to properly interpret travel time differences to reflecting interfaces, so as to determine the slope or the dip of those reflecting interfaces. These differences in time through the weathered (or weathering or LVL) layer are called the fixed or static corrections.

A. In the case of dynamite shots, the travel time of the seismic wave through the weathering, or the depth to the base of weathering, can often be determined from measurement of the seismic pulse from the deep shot to a surface geophone at the shot point. This is called the uphole time. Of course, this method can not be used with surface sources.

B. Another qualitative method involves determining static corrections by adjusting travel times so that a strong shallow reflection, which is believed to be flat, will be shown on the record as a true horizontal reflection.

C. Another qualitative method that has been used involves adjusting the travel times of a plurality of travel paths from different source and receiver points to the same common reflection point.

Vibratory seismic systems and other systems that use seismic sources at the surface of the earth, are limited in their capability to determine static corrections, because there are no drilled holes, and no subsurface sources.

The method of determination as described in B and C above are not reliable, since basing the corrections on deep reflection information involves many variables, few of which are known. It is clear therefor that there is no reliable method in use today for determining the static corrections.

SUMMARY OF THE INVENTION

It is a primary object of this invention to provide a method of determining the differential static correction between adjacent source points by timing corresponding traces of two records taken at adjacent source points to spaced receiver points, upline and downline from the sources.

It is a further object of this invention to provide a method of determining the differential static correction between adjacent geophone or receiver points by timing corresponding pairs of traces from spaced source points up line and down line from the receiver points.

It is a still further object of this invention to determine the time differences between two corresponding pairs of traces by correlating portions of the first pair and of the second pair to obtain two time differences $R$ and $S$, and determining $K = (R - S)/2$, the differential static correction.

These and other objects and advantages of this invention are realized and the limitations of the prior art are overcome in this invention by recording two multiple trace records taken from adjacent source points to geophones placed up line and down line from the sources. The first refraction portions of each trace from the first break to a selected time value past the first break are isolated. These refraction portions of the record, in pairs of traces having the same geophone point, are correlated, and the lead or lag of one trace with respect to the other are determined, to provide time differences R for geophone points down line, and S for geophone points up line. The values of $K = (R - S)/2$ is then determined where $K$ is the value of the differential static correction for the two source points.

Using the same source points, values of R and S for other geophone points are determined, providing new independent values of K for different travel paths. The values of K are then averaged and the average difference determined. This average difference is the lead or lag of the travel time through the weathered layer, at the two source positions, which is the relative static correction of the second record with respect to the first record.

This method provides a precise value for the difference in travel time to the base of weathering at each pair of source points. The precision of measurement is increased with increase in the number of pairs of traces correlated, and with decrease in the spacing between adjacent source points.

Consequently, the precision is greatest in records taken with surface sources, where a great number of separate channels are recorded, and where a source is positioned at each detector point. Such a system is fully described in copending application Ser. No. 617,859, to which reference has been made.

In this method, one pair of traces from adjacent source points D and E to an upline receiver point C are correlated to provide a value of time difference S. The pair of traces from both source points to the down line receiver point F are correlated to provide a value of time difference R. The value of $K$ is then $(R - S)/2$.

Although the method requires two trace correlations to determine one value of K, the calculation is independent of the distance between geophones and source points. One receiver point can be kept fixed, keeping R or S constant. In that case each correlation of two traces from the two sources to a new geophone point will provide a new value of S or R, and therefor of K.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 illustrates the transmission of seismic energy from a pair of adjacent source points D and E to a plurality of spaced geophone points A, B, C, F, G, H, etc. on the surface, by refraction at the base of the weathered layer, and by reflection to a deep reflecting interface.

FIG. 2 illustrates the refraction portion of traces recorded from adjacent source points D and E to receiver points upline and down line from D and E.

FIG. 3 illustrates the transmission and reception of seismic energy at receiver points D and E from a plurality of source points A, B, C, up line, and F, G, H, down line from D and E.

DESCRIPTION OF THE PREFERRED EMBODIMENT

Referring now to the drawing, and in particular to FIG. 1, there is shown a cross section of a portion of the earth 10 having a surface contour 14, a weathered layer 12, an interface plane 18 between the weathered layer 12 and the subweathered layer 11. At some greater depth there is another reflecting interface or plane 20, between two geologic formations 11 and 16.

There are two source positions D and E on the surface 14. These can be vibratory sources or impulsive sources. If they are vibratory sources the records must be correlated with the sweep to get correlated traces, or correlograms, which are then processed.

A plurality of geophones A, B, C, F, G, H, etc. are positioned on the surface 14, along the survey line, through which the vertical cross section is taken. The spacing along the surface of the source points D and E and the geophone points can be regular or irregular. Preferably, the sources are located at geophone positions, which are equally spaced along the line. However, this method is independent of the spacings between the source points and the geophones, etc.

When a source is at position D and energized, the seismic wave will progress by path $d,n,c$ to up-line geophone C. That is, the energy goes substantially vertically downward, $d$, to the base of weathering interface 18. The velocity of propagation of the seismic (elastic) wave in the weathered layer 12 is quite low, of the order of 1500 to 2500 fps. The velocity of propagation in the subweathered layer 11 (just below the interface 18) may be 5000 to 6000 fps. So energy that goes down to the interface 18 and is refracted, $n$, horizontally in 11, then up, $c$, to geophone C, will be the first signal (first break, or first arrival) to reach the geophone C. It will arrive before the energy through the direct path 27 arrives, because of the low velocity in 12.

This path is important since it includes the leg $d$, which, because of the unknown low velocity in 12, represents a sizeable time interval. If the thickness of the weathered layer is known imperfectly, and its velocity is known imperfectly, there can be a large time error in deteriming the vertical travel time through the weathered layer.

The seismic wave from source D also goes by path $d,o,p,f$, to down line geophone F, passing through the vertical leg $d$, it is refracted horizontally $o,p$, and then rises vertically $f$, to geophone F.

Drawn in FIG. 1 are ray paths CD', DE', FD' and FE' from source positions D, E to a deep reflecting horizon 20, where the rays are reflected at 22,23,24,25 and returned to the surface by rays C'D, C'E, F'D, F'E to geophones C and F. It will be clear that the path $d$, through the weathered layer 12 forms a part of the deep paths to the geophones. Thus, error in determination of the travel time through the leg $d$, can cause a large error in estimation of the depth of the interface 20.

While it is desirable to know the absolute travel times $d$, and $e$, it is impossible to get that information without drilling a hole to the interface 18 and actually measuring the travel time.

While the absolute depth of the reflecting interface 20 is desirable, the most important parameter is the dip, or slope, of the interface 20. This can be found by taking the difference in the travel times over the adjacent legs d and e. Since by repeating the process between successive pairs of source points, the weathering time difference between any two source points can be determined, the problem then resolves itself into finding the travel time differences over paths d and e.

FIG. 2 shows parts of two records taken with the source successively at points D and E, respectively. The vertical line $T_O$ represents the time break, or time at which the source acted. The traces labelled A, B, C, F, G, H represent the seismic energy received at the corresponding geophones.

The received seismic signal is shown as a short burst, and since the signals from two sources arrive at the geophones at different times, the two sets of traces are superimposed, for convenience of illustration. EF and DF are the signals from D and E to F, and DC and EC are the signals from D and E to C.

The signals from the geophones go by leads 32, 34 to a multichannel amplifier assembly 36, and then by leads 37 to a correlator 38, where the traces are correlated against a sweep signal, and then by leads 39 to a recorder 41. The correlation step need not be done "on line," but all of these steps are well known in the industry and need not be described further.

In FIG. 2 the abscissa is time, increasing to the right. Time $T_O$ represents the source time. Times $T_{EF}$ and $T_{DF}$ represent the travel time to geophone F from sources E and D respectively, over paths $e,p,f$ and $d,o,p,f$, respectively. Since the path from D to F has an additional horizontal segment $o$, $T_{DF}$ is greater then $T_{EF}$.

As regards the signal from D and E to upline geophone C, the corresponding signals are DC and EC, and the travel times are $T_{DC}$ and $T_{EC}$ respectively, over paths $d,n,c$ and $e,o,n,c$, respectively. Again the path difference includes the segment $o$, but in a negative sense, since the travel is in the opposite direction to that for geophone F.

Travel time $(EC)$ − travel time $(DC)$
= $(e + o + n + c) - (d + n + c)$
= $(e-d+o) = S$, the upline travel time difference.
Travel time $(DF)$ − travel time $(EF)$
= $(d + o + p + f) - (e + p + f)$
= $(d-e+o) = R$, the down line travel time difference.
Let
$K$ = the differential static correction at D and E
= $(R - S)/2$
= $\frac{1}{2} [(d - e + o) - (e - d + o)]$
= $(d - e)$ In FIG. 2 the travel time from E to C and from D to C are given by times $T_{EC}$ and $T_{DC}$ respectively, as measured from $T_O$, the time of initiation of the seismic wave. The time difference S is shown as the time difference between $T_{EC\,and\,TDC}$. Similarly, time difference R is shown as the time difference between $T_{DF}$ and $T_{EF}$.

If the traces are clear enough to pick by eye, the instant of arrival of the signals EC, DC, etc. then the values of $T_{EC}$ and $T_{DC}$ can be read by eye, and the differences R and S can be measured.

Also, the eye can be used to correlate the traces from C to D and E. That is, by sliding one trace longitudinally with respect to the other, until the signals DC and EC are superimposed, then the displacement of the $T_O$ values for each trace can be determined as the value of S. This is called correlation by eye and has often been practiced in the past in seismic record interpretation.

However, in these days of computer data processing, the preferred way is to mathematically correlate signal EC with signal DC. By doing this, the difference in timing of the two signals is precisely obtained. There have been many issued patents and technical articles which fully describe the correlation process, so that further description is not required.

It is possible to describe the method of this invention as:

At two adjacent source locations D, E sequentially recording a plurality of traces at a plurality of geophones spaced from the source up line and down line; selecting two geophone signals from a geophone spaced down line from the two sources in successive records; slowly varying the time phase between the two signals (traces); repeatedly multiplying together the signals to produce product functions; repeatedly forming the integral of these product functions for separate different values of time phase; and recording the values of these integrals in relation to the different values of varying time phase. This is the classical mathematical process of correlation, as applied to one pair of traces, say DF and EF. This produces the time difference R. The same process is repeated by correlating two traces EC and DC to provide the time difference S. The desired value of $K = (R - S)/2$.

To perform the classical correlation it is necessary to isolate pairs of traces DF from source D and EF from source E, and so on. The entire trace can be used, or only the part of it that is useful. Since the part of real value is the first part, where the principal energy comes by the refraction of energy at the base of weathering, it is preferable to isolate the first part of the trace, say for 100 milliseconds, or perhaps 150, or 250 ms, with the remainder of the trace muted.

It will be clear from equations 1, 2, 3 that this operation for determining K involves:

a. correlation of two traces DF and EF from two sources D and E to a single downline geophone F, to obtain time difference R;

b. correlation of two traces DC and EC from the same two sources D and E to a single upline geophone C, to obtain the time difference S; and c. Determination of $K = (R - S)/2$.

There is no requirement of distance at all, since all horizontal distances cancel out. Consequently, the same process can be used for all traces from D, E to all down line geophones, F, G, H, etc. These separate correlations will give independent values of R, such as $R_F$, $R_G$, $R_H$, etc. The average value of all of these values of R is the best statistical value of R' that can be obtained.

Similarly values of S can be obtained by correlating pairs of traces from sources D,E to all of the up line geophones. The average of all values of $S_C$, $S_B$, $S_A$, etc. gives the best statistical value of S' that can be obtained. And, of course $K = (R' - S')/2$. It is not necessary to have as many values of R as of S. The larger the number of independent values of R and S the better the average value of K that is obtained.

When the average value of K for all geophones and sources D and E is obtained, the entire process is repeated using source E and adjacent source point E', and so on. Of course, having recorded traces from D and E to obtain $K_{DE}$, all of the traces from E to all geophones are on hand, and all that is necessary to determine $K_{EE'}$ is to record a third record from source point E' to all geophones and proceed with the processing.

It will be clear that the larger the number of traces, N, the larger the number of pairs of traces, and the better the average values of R and S obtained, and the better the value of K, to the end that the effects of noise on the traces are minimized, and as precise a value of weathering correction as desired can be determined. Also, the closer the position of the two source points, the more precise the value of the correction. by recording trace In the ultimate case, the preferred system provides a great number of separate traces, say up to 256, with a source point at each geophone position. While this involves handling on a computer a great number of traces, it only requires a short length of trace. Furthermore, as has been shown in application Ser. No. 617,859, recording each tract to only 1 bit, and by compositing a great many traces, it is possible to store and handle many traces at great speed, to provide a precise determination of fixed corrections.

While FIG. 1 has been drawn and described for the case where the differential weathering correction has been determined for two adjacent source points, the method can be used equally well for determining the differential static correction between adjacent receiver points or geophone points.

Such a system is indicated in FIG. 3, which has similar point designations and lateral spacings, except D and E are now receiver points with geophones connected through leads 34 to multichannel amplifier 36 and recorder 41. The other points A, B, C, F, G, H, etc. are source points. The traces which are correlated are the pairs of traces to D and E from each of the source points and so on.

While I have shown the point spacings irregular, this is only for the purpose of indicating that the spacings between sources and receivers do not enter into the calculation. The normal process, wherein all receiver points are equally spaced can be used equally well. Also, in this method the source spacing need not be the same as the geophone spacing, although for other reasons that may be desirable.

While FIG. 1 illustrates the use of vibratory sources, with the inclusion of means to correlate the received signals with the sweep, it will be clear that this method is equally applicable to seismic operations using sources of any type, and including, but not limited to systems which use surface sources, such as vibratory sources, surface impulsive sources such as Dynoseis, or thumper or explosive sources, shallow inhole impulsive sources, and deep inhole impulsive sources, and so on.

While FIG. 2 shows the received seismic signals EF, DF, DC, EC, etc. as short pulses, this is only for convenience, to superimpose records from sources D and E without overlapping the traces. Normally the received signals will continue from 1 to 5 seconds for impulsive sources, and from 7 to 20 or more seconds for vibratory signals. However, for the purpose of correlating trace pairs, it has been found that only a short portion of the traces is necessary, such as, for example, the first 100 to 250 milliseconds after the first breaks, which contain most of the energy refracted at the base of weathering.

FIGS. 1 and 3 show the horizontal path segments $m$, $n$, $o$, $p$, etc. as separate lines, one for each of the two sources, or one for each of two receivers. This is only for purpose of illustration, and the seismic energy will travel, in all cases, in the high velocity zone 11 below the weathering interface 18.

In summation, the method of determining the differential weathering static correction between two adjacent source points (FIG. 1) D and E involves the steps of recording traces from D and E to geophones C and F, up line and down line, at any distance. Traces DF and EF are then correlated to provide a time difference R. Traces DC and EC are correlated to give a time difference S. The value of $K$ is then given by $(R - S)/2$. This process is repeated for other receiver points, providing additional independent values of K, all of which are averaged to provide the statistically best value of K.

In the case of FIG. 3 the method of determining the differential static correction between two adjacent receiver points D and E is to record traces to D and E from up line source C and down line source F; correlating traces DF with EF to get a first time difference R; correlating traces DC and EC to get a second time difference S and determining $K = (R - S)/2$. Additional pairs of traces are recorded, correlated and processed to obtain other values of K which are averaged to provide a final value of K.

It will be clear that the separate values of R and S can each be averaged, and then the value of K determined.

Normally a source at each source point will be recorded at each receiver point, and the traces sorted and gathered, to provide the pairs required for the above processing. This sort of trace sorting and gathering is very common in seismic data processing, such as in common depth point stacking, and so on, and need not be described further.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a seismic system having a linear array of receiver positions, A, B, C, and F, G, H, etc. and closely-spaced source positions D, E, therebetween, the method of determining the differential static correction through the weathered layer at source positions D and E, comprising the steps of:
   a. recording a first record from source point D to receivers C, upline, and F, downline, from source D.
   b. recording a second record from source point E to receivers C, up line, and F, downline, from source E;
   c. correlating a first pair of traces DF and EF to provide a first time difference R between said first two traces;
   d. correlating a second pair of traces EC and DC to provide a second time difference S between said second pair of traces; and
   e. determining $K_1 = (R - S)/2$, where $K_1$ is the first value of differential static correction at source points D and E.

2. The method as in claim 1 including repeating steps (a), (b), (c), (d), and (e) for other positions of receivers C and F, such as B and G, respectively;
   f. determining a second value of $K_2 = (R - S)/2$ for receiver points B and G, and
   g. determining the average value $K_A$ of $K_1$ and $K_2$.

3. The method as in claim 2 including the step of applying the determined correction $K_A$ to one of said first and second records with respect to the other.

4. The method as in claim 1 including the steps of
   h. repeating steps (a) and (b) for a new position of F such as G;
   i. repeating step (c) to obtain a new value of $R_G$ of R;
   j. repeating step (e) using the value of $R_G$ and the previous value S to provide a value $K_3 = (R_G - S)/2$; and
   k. determining the average value $K_A$ of $K_3$ and $K_1$.

5. The method as in claim 4 in which the number of traces per record is at least 100.

6. The method as in claim 1 in which said step (c) of correlating a pair of corresponding traces comprises the steps of
   a. multiplying said two corresponding traces;
   b. varying the time phase of one of said pair of traces with respect to the other, and repeating said multiplying step;
   c. integrating said products at each value of time phase;
   d. displaying said integrals as a function of said time phase.

7. The method as in claim 1 in which said correlation is made between selected equal portions of each of said traces.

8. The method as in claim 7 in which said selected portion of said traces includes the portion from the first break to a selected time interval after said first break.

9. The method as in claim 8 in which said selected time interval is less than 100 milliseconds.

10. The method as in claim 8 in which said time interval is less than 250 milliseconds.

11. The method as in claim 1 in which said step of correlation comprises the steps of measuring the travel time for each trace from the time break to the first break and, subtracting one travel time from the other.

12. The method as in claim 11 in which the time difference is measured optically from a printed record.

13. The method as in claim 1 in which the source is impulsive.

14. The method as in claim 1 in which said source is vibratory, and including the step of correlating the record against the sweep before correlating said pair of traces.

15. The method as in claim 1 in which said sources are surface sources.

16. The method as in claim 1 in which each source point coincides with a geophone position.

17. The method as in claim 1 in which there are as many source points as geophone positions.

18. In a seismic system having a linear array of source positions A, B, C, and F, G, H, etc. and receiver positions D and E therebetween, the method of determining the differential static correction through the weathered layer at receiver points D and E, comprising the steps of:
   a. recording a first record from down line source F to receivers D and E to obtain a first trace pair FD and FE;
   b. recording a second record from up line source C to receivers D and E to obtain a second trace pair CD and CE;
   c. correlating said first trace pair FD and FE to provide a first time difference R between the first trace pair;
   d. correlating said second trace pair CD and CE to provide a second time difference S between the second trace pair; and
   e. determining $K_1 = (R - S)/2$, where $K_1$ is the first value of differential static correction at receiver positions D and E.

19. The method as in claim 18 including repeating the steps (a), (b), (c), (d), and (e) for other source positions C and F, such as B and G respectively;
   f. determining a second value of $K_2$ for sources B and G; and
   g. Determining $K_A$, the average value of $K_1$ and $K_2$.

20. The method as in claim 18 including
   h. repeating steps (a), and (b) for a new position of F, such as G;
   i. repeating step (c) to obtain a new value $R_G$ of R;
   j. repeating step (e) using values of $R_G$ and S to provide a value $K_3$ of $K = (R_G - S)/2$; and
   k. determining the average value $K_A$ of $K_3$ and $K_1$.

* * * * *